United States Patent
Semegen et al.

(10) Patent No.: US 12,453,894 B2
(45) Date of Patent: Oct. 28, 2025

(54) SYSTEM AND METHOD FOR MONITORING A FREE WEIGHT SYSTEM

(71) Applicant: HEAVY KINEMATIC MACHINES SP. Z O. O., Komorowo (PL)

(72) Inventors: Mateusz Semegen, Komorowo (PL); Maciej Rot, Komorowo (PL); Kacper Ostrowski, Komorowo (PL); Rafal Kasperowicz, Komorowo (PL)

(73) Assignee: HEAVY KINEMATIC MACHINES SP. Z O. O., Komorowo (PL)

( * ) Notice: Subject to any disclaimer, the term of this patent is extended or adjusted under 35 U.S.C. 154(b) by 148 days.

(21) Appl. No.: 18/036,421

(22) PCT Filed: Nov. 15, 2020

(86) PCT No.: PCT/EP2020/082168
§ 371 (c)(1),
(2) Date: May 11, 2023

(87) PCT Pub. No.: WO2022/100859
PCT Pub. Date: May 19, 2022

(65) Prior Publication Data
US 2024/0108946 A1 Apr. 4, 2024

(30) Foreign Application Priority Data
Nov. 14, 2020 (EP) .................... 20461581

(51) Int. Cl.
*A63B 24/00* (2006.01)
*A63B 21/072* (2006.01)
*A63B 71/06* (2006.01)

(52) U.S. Cl.
CPC ...... *A63B 24/0006* (2013.01); *A63B 21/0724* (2013.01); *A63B 24/0062* (2013.01);
(Continued)

(58) Field of Classification Search
CPC ............ A63B 21/0724; A63B 21/0726; A63B 21/075; A63B 24/0006; A63B 24/0062;
(Continued)

(56) References Cited

U.S. PATENT DOCUMENTS

| | | | |
|---|---|---|---|
| 9,135,347 B2 * | 9/2015 | Damman | G06Q 10/10 |
| 9,468,793 B2 * | 10/2016 | Salmon | A63B 21/0724 |
| 10,065,074 B1 | 9/2018 | Hoang et al. | |
| 10,376,739 B2 * | 8/2019 | Cook | G16H 20/30 |
| 10,549,154 B2 * | 2/2020 | Den Hollander | H04W 4/38 |
| 10,661,148 B2 * | 5/2020 | Huang | A63F 13/212 |

(Continued)

FOREIGN PATENT DOCUMENTS

| | | |
|---|---|---|
| WO | 2016138042 A2 | 9/2016 |
| WO | 2020019041 A1 | 1/2020 |

*Primary Examiner* — Joshua Lee
(74) *Attorney, Agent, or Firm* — Rivka Friedman (57) ABSTRACT

A method for monitoring a free weight system with a load bearing member having a sensor mounted thereon. The load bearing member has additionally mounted thereon at least one weight, each having a further sensor mounted thereon, wherein said sensor comprises an accelerometer and a gyroscope and is associated with a weight value. The method includes receiving motion data sets from the sensor and the at least one further sensor; for each of the motion data set correcting acceleration data based on gyroscope data; based on the corrected acceleration data obtained as corrected motion data sets, identifying moving sensors; grouping, among the moving sensors, the sensor with at least one of the at least one further sensor based on the corrected acceleration data being concurrent among the respective corrected motion data sets.

10 Claims, 8 Drawing Sheets

(52) U.S. Cl.
CPC ...... *A63B 71/0619* (2013.01); *A63B 2220/17* (2013.01); *A63B 2220/44* (2013.01); *A63B 2220/52* (2013.01); *A63B 2220/833* (2013.01); *A63B 2225/02* (2013.01); *A63B 2225/15* (2013.01)

(58) Field of Classification Search
CPC ............ A63B 71/0619; A63B 2220/17; A63B 2220/34; A63B 2220/40; A63B 2220/44; A63B 2220/52; A63B 2220/62; A63B 2220/80; A63B 2220/833; A63B 2225/02; A63B 2225/15; A63B 2225/50
See application file for complete search history.

(56) References Cited

U.S. PATENT DOCUMENTS

| | | | |
|---|---|---|---|
| 10,699,177 B2* | 6/2020 | Bengtsson | G06K 7/10128 |
| 10,878,952 B1* | 12/2020 | Patel | G06K 7/10297 |
| 11,266,878 B2* | 3/2022 | Dornan | A63B 71/0622 |
| 2015/0057128 A1* | 2/2015 | Ishii | A61B 5/1114 |
| | | | 482/8 |
| 2016/0023043 A1* | 1/2016 | Grundy | A63B 59/00 |
| | | | 482/8 |
| 2016/0346617 A1* | 12/2016 | Srugo | A63B 23/0405 |
| 2017/0076619 A1* | 3/2017 | Wallach | G09B 19/0038 |
| 2017/0128765 A1 | 5/2017 | Garretson et al. | |
| 2017/0216665 A1* | 8/2017 | Mahr | A63B 71/0619 |
| 2017/0368413 A1* | 12/2017 | Shavit | A63B 24/0075 |
| 2018/0156657 A1* | 6/2018 | Lee | G01V 15/00 |
| 2022/0133198 A1* | 5/2022 | Popov | A61B 5/1107 |
| | | | 73/379.01 |

* cited by examiner

SYSTEM AND METHOD FOR MONITORING A FREE WEIGHT SYSTEM

TECHNICAL FIELD

The present invention relates to a system and method for monitoring a free weight system. In particular, the present invention relates to monitoring of a free weight system wherein the monitoring concerns collecting exercise-related data such as current system weight and number of repetitions of a given exercise. The collected data may also be reported internally and/or externally.

BACKGROUND OF THE INVENTION

Free weights are any equipment used for weight training that is not integrated in any larger apparatus and is lifted in its entirety with one or two hands e.g. barbells or dumbbells or adjustable kettlebells or Plate Load machines.

Unlike weight machines, free weights require more effort from an individual performing training using such devices, because they do not constrain users to predefined movements.

Free weight training is very popular because of very broad configuration options. Weights, put on a grip portion of a dumbbell or on a bar of a barbell, are available in different shapes, sizes and weights.

Another advantage is that training may be performed at any place, not only at a fitness center.

However, the above features of free weights make them also difficult to track in terms of exercise monitoring in an automatic manner. Especially when so-called retrofit systems are concerned that have been produced without any sensors or electronic systems to support such automatic monitoring. In such retrofit systems, the monitoring systems are added after such a free weight system is obtained/purchased by a user.

A first specific problem is how to detect, which weights have been installed on a bar or a grip portion wherein such a detection shall preferably not involve any attention from the user. Another problem is how to detect repetitions of exercises in case of free weight systems.

There are further plate load machines, in which a load is defined by putting on different weights similarly as in case of barbells. Different rods are typically provided for load positioning.

It would thus be favorable to define a solution for monitoring free weight devices that would be applicable to all kinds of such devices and optionally be also movable from one free weight device to another, which would be favorable from a perspective of home users.

The aim of the development of the present invention is an improved system and method for monitoring a free weight system.

SUMMARY AND OBJECTS OF THE PRESENT INVENTION

An object of the present invention is a method for monitoring a free weight system comprising a load bearing member having a sensor mounted thereon, wherein the load bearing member has additionally mounted thereon at least one weight each having a further sensor mounted thereon wherein said sensor comprises an accelerometer and a gyroscope and is associated with a weight value, the method comprising the steps of: receiving weight information motion data sets from the sensor and the at least one further sensor; for each of the motion data set correcting acceleration data based on gyroscope data; based on the corrected acceleration data obtained as corrected motion data sets, identifying moving sensors; grouping, into one or more groups, among the moving sensors, the sensor with at least one of the at least one further sensor based on the corrected acceleration data being concurrent among the respective corrected motion data sets.

Preferably, the corrected acceleration data are obtained by rotating an accelerometer's vector of acceleration by a rotation identified by the gyroscope.

Preferably, the corrected acceleration data are obtained by further subtracting the gravity value.

Preferably, wherein said sensor further comprises a magnetometer while the step of correcting acceleration data further comprises correcting drift.

Preferably, communication with each sensor is effected by using a sub-1 GHz wireless communication.

Preferably, the grouping is further based on constant characteristic parameters associated with a sensor and movement similarity in time between sensors.

Preferably, the grouping is further based on one or more preceding grouping.

Preferably, the method further comprises calculating weight for each of the one or more groups based on weight information of each sensor associated with that particular group.

Another object of the present invention is a computer program comprising program code means for performing all the steps of the computer-implemented method according to the present invention when said program is run on a computer.

Another object of the present invention is a computer readable medium storing computer-executable instructions performing all the steps of the computer-implemented method according to the present invention when executed on a computer.

Another object of the present invention is a system configured to execute all steps of the method according to the present invention.

BRIEF DESCRIPTION OF THE DRAWINGS

These and other objects of the invention presented herein, are accomplished by providing a system and method for monitoring a free weight system. Further details and features of the present invention, its nature and various advantages will become more apparent from the following detailed description of the preferred embodiments shown in a drawing, in which.

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

As utilized herein, the term "example" means serving as a non-limiting example, instance, or illustration. As utilized herein, the terms "for example" and "e.g." introduce a list of one or more non-limiting examples, instances, or illustrations.

DESCRIPTION OF EMBODIMENTS

Figure 1A:
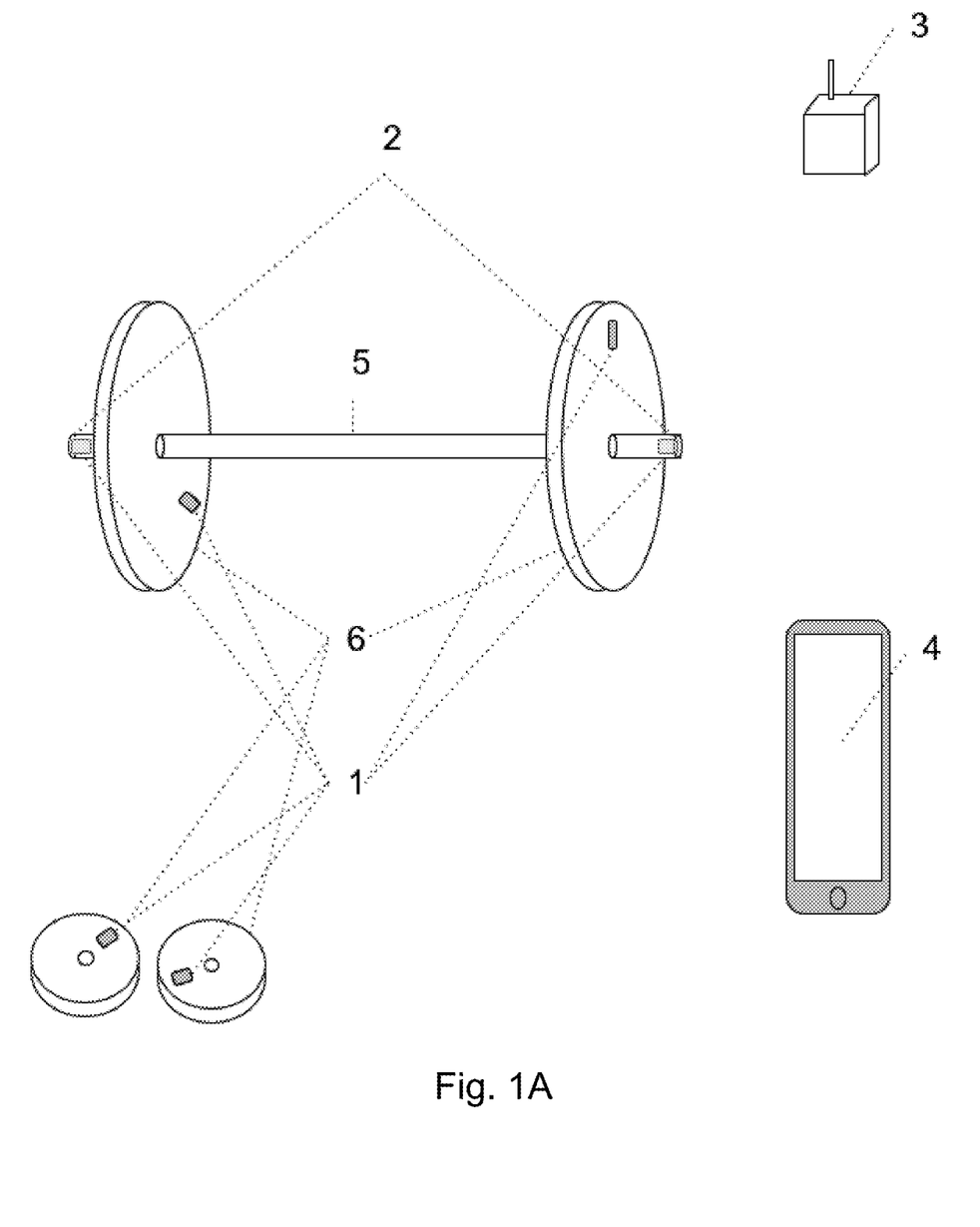
FIG. 1A presents a general overview diagram of the system according to the present invention.

FIG. 1A presents a general overview of the system according to the present invention. The system comprises at least one sensor 1 comprising an accelerometer and a gyroscope as well as optionally a magnetometer whereas the sensor 1 further comprises a communication module, which is preferably a sub-1 GHz communication.

The system further comprises at least one (passive) NFC tag and a data collecting device 3. A user's mobile device 4 (such as a mobile phone, a tablet, a smartwatch, a smart-fitness band or the like) may comprise an application configured to communicate with the data collecting device 3.

The free weight machine/system as such comprises for example a bar 5 and respective weights 6.

A sensor 1 is mounted on a weight 6 body (such as a weight plate) while further sensors 1 are mounted on each end of the bar 5 (or an equivalent element, which may be generically called a load bearing member). In case of dumbbells these ends will correspond to ends of a grip portion and in case of plate load machines these ends will correspond to the ends of respective rods, on which weight plates are mounted.

On these ends there are also preferably mounted NFC tags 2 (one NFC tag is sufficient in principle however in case of long bars such as 2m, it is convenient to have an NFC tag 2 at each end of the bar 5). These NFC tags 2 carry data identifying properties of the respective sensors 1 as well as an identifier.

The embedded data of such an NFC tag 2 may comprise: an identifier ID, which is needed by the data collecting device 3 to identify and track movement of a weight, weight, an optional identifier of a kind of an associated item e.g. a bar, a grip portion, a rod etc., as well as other optional properties such as a size of an associated item e.g. length of a bar, a radius of an associated weight etc.

Such NFC tags 2 support easy configuration with a user's mobile device 4 but are in principle not essential for carrying out the present invention.

In other words, there are not preferably present collective identifiers for a group of sensors.

Such NFC tags 2 (in another embodiment there may be only one tag) allow to pre-configure a free weight system and upon request provide such a configuration to a corresponding application on a user's mobile device. Thus, when a new user would like to exercise with a such a pre-configured free weight, the user only starts a corresponding application on the mobile device 4 and scans the NFC tag 2. The application sets up the free weight monitoring based on the configuration read from the NFC tag 2.

Figure 1B:
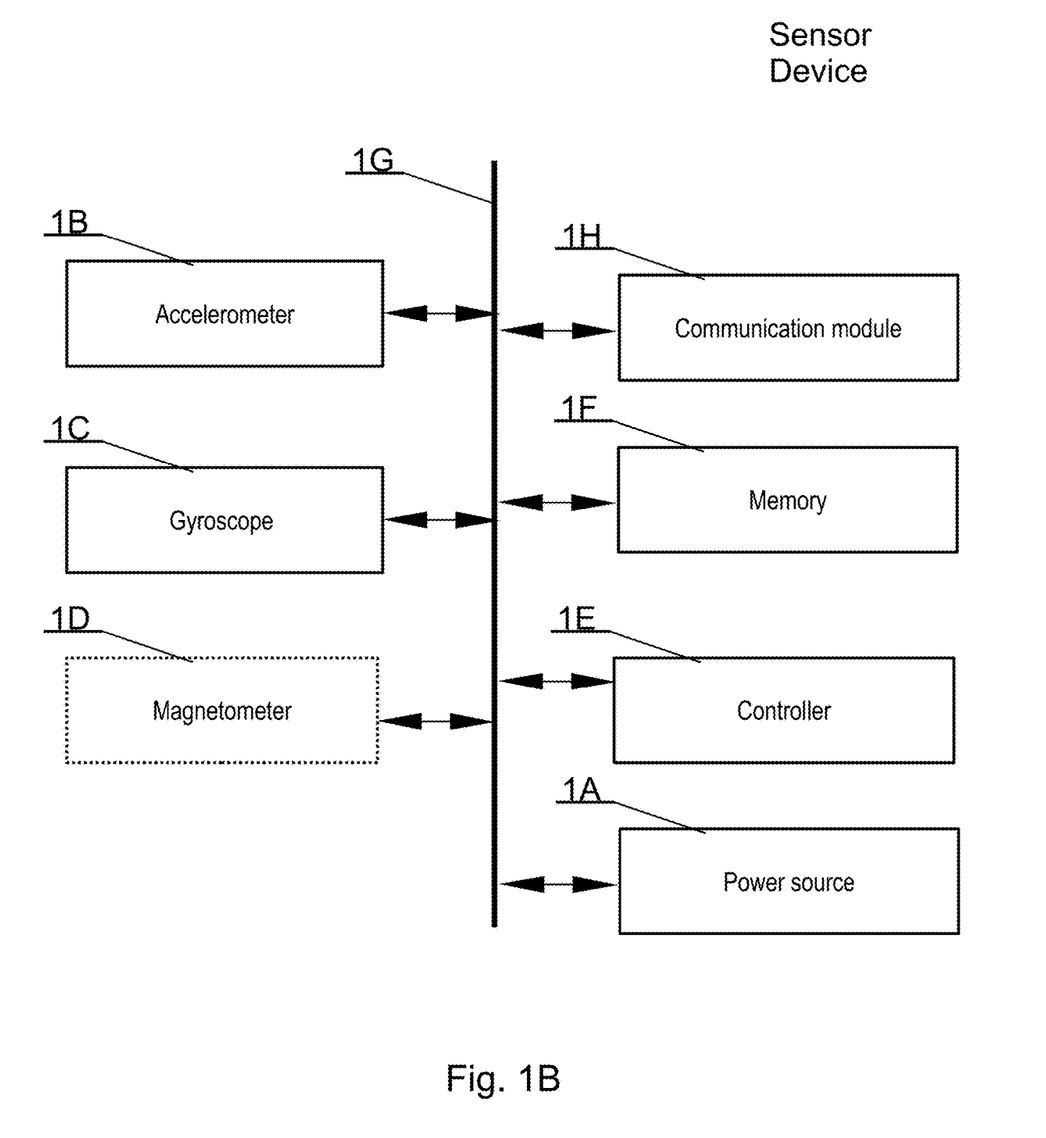
FIG. 1B presents a diagram of a sensor according to the present invention.

As shown in FIG. 1B, each sensor 1 has its own power source such as a battery 1A and is configured to read signals from the accelerometer 1B, the gyroscope 10 and the optional magnetometer 1D. Such signals allow to describe a movement of a given object, on which the respective sensor 1 is mounted.

The optional magnetometer 1D may be used to invoke a setup mode based on a magnetic field above a given threshold. Typically, a relatively strong magnetic field that is not present in normal operating conditions. In such a setup mode a weight value may be given and stored as a configuration parameter.

The magnetometer 1D may also be used in order to improve precision of movement tracking (of the respective sensors 1 and thereby their associated weights) by correcting drift for example according to a "Rest Pose Magnetometer-based drift Correction" process.

The weight as well as other setup data are preferably transmitted from the data collecting device 3, especially when a sub-1 GHz communication is used (as explained in the remainder of the specification). This in turn means that a user device preferably may not be in direct communication with the sensors 1.

Each sensor 1 communicates with the data collecting device 3 by means of a communication module 1H, which may be any wireless communication and in particular the sub-1 GHz communication as already mentioned.

Each sensor 1 also emits 1H data describing such movement to an external data collecting device 3. A controller 1E manages operation of the sensor 1 and uses memory 1F to store any temporary data signals when needed. The memory 1F may also store any configuration data or data of software executed by the aforementioned controller 1E.

Communication between different modules of the system may be effected by a suitable communication bus 1G.

The data describing movement (or otherwise motion data) may be provided as raw data to the external data collecting device 3 or be provided in a processed form in order to decrease the amount of transmitted data in time. This also depends on capabilities of the controller 1E as well as sampling rate applied by the sensor 1.

The data collecting device 3 registers and tracks data of a plurality of sensors 1 and groups them according to characteristics of detected movements. Additionally, the data collecting device 3 associates the sensors 1 to a bar 5 (the bar is also associated with a given user during an exercise session).

As an option, two sensors positioned at the ends of the bar 5 allow to detect irregularities in training such as holding the bar in a non-parallel manner (with respect to a predefined horizontal alignment).

Figure 2:
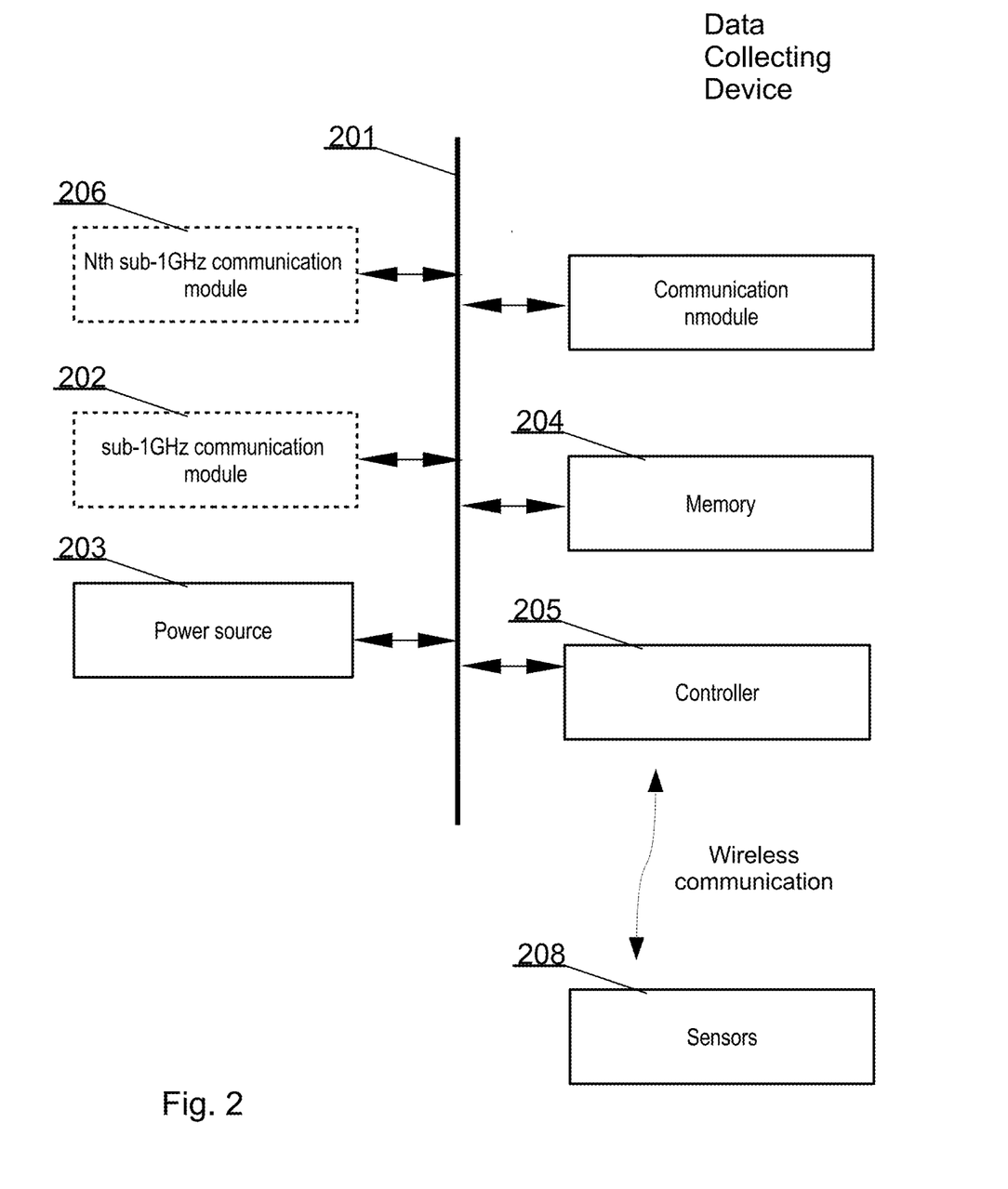
FIG. 2 presents a diagram of the system according to the present invention.

FIG. 2 presents a diagram of the data collecting device 3 according to the present invention. The collected data may be further processed in order to identify an exercise repetition and to identify a number of weights in motion.

Preferably, the data collecting device 3 registers all received signals emitted by the sensors. When the received data are valid, the data collecting device 3 attempts to associate the sensors with other sensors. Thereby the system is more flexible, because addition of an element only requires a configuration of a new sensor 1 of a weight.

The system may be realized using dedicated components or custom made FPGA or ASIC circuits. The system comprises a data bus 201 communicatively coupled to a memory 204. Additionally, other components of the system are communicatively coupled to the system bus 201 so that they may be managed by a suitable controller 205.

The memory 204 may store computer program or programs executed by the controller 205 in order to execute steps of the method according to the present invention. The memory 204 may store also any temporary data as results as well as results stored permanently.

The data collecting device 3 may be powered from a battery 203 and comprises suitable communication means 206 such as Bluetooth, Wi-Fi, ANT+ or the like (preferably low-power protocols).

In an embodiment of the present invention a communication between the data collecting device 3 and the sensors 1 may be effected via a different communication medium than the communication between the data collecting device 3 and a user's mobile device 4.

In this embodiment an optional sub-1 GHz communication 202 is used, which allows for a greater range, communication with less delay as well as allows for a greater number of sensors. At the same time, energy consumption may be lowered, which is important in case of devices mounted on respective weights (e.g. a smaller battery may be used).

A change of communication frequency range as well as not relying on a Bluetooth communication stack provides the aforementioned advantages but will usually result in lowered throughput and of course requires dedicated transmitter/receiver.

When a number of sensors 1 may be large, the data collecting device 3 may comprise a plurality of the sub-1 GHz communication modules 202, 206 in order to support greater bandwidth.

Figure 3:
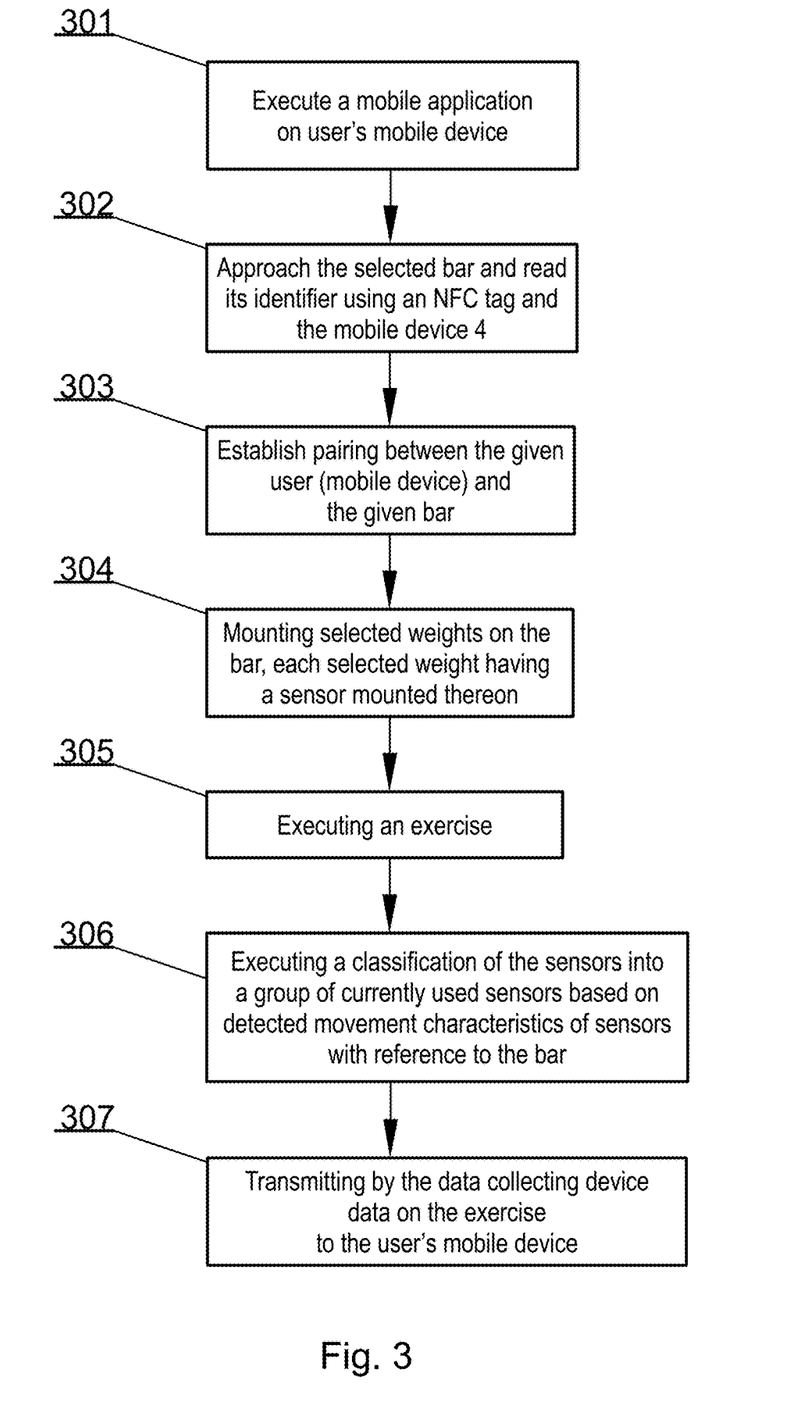
FIG. 3 presents a diagram of the method according to the present invention.

FIG. 3 presents a diagram of the method according to the present invention. This is a method as seen from a user's perspective. The method starts at step 301 from starting a dedicated application on the mobile device 4. Next, at step 302, the user approaches the selected grip portion, rod portion or a bar 5 and reads its identifier using an NFC tag 2 and the mobile device 4 with the executed application.

Subsequently, at step 303, the application of the mobile device 4 connects with the data collecting device 3 (which is identified in the NFC data tag 2) and informs thereby of establishing a pairing between the given user (mobile device 4) and the given bar 5.

Further, at step 304, selected weights are mounted on the bar 5 while each selected weight has a sensor 1 mounted thereon.

At step 305 an exercise is performed by the user such that the bar and the weights mounted thereon move in space. The data collecting device 3 executes, at step 306, a classification of the respective weights (sensors 1) into a group of currently used sensors 1 based on detected movement characteristics of sensors 1 with reference to the bar 5.

Figure 6:
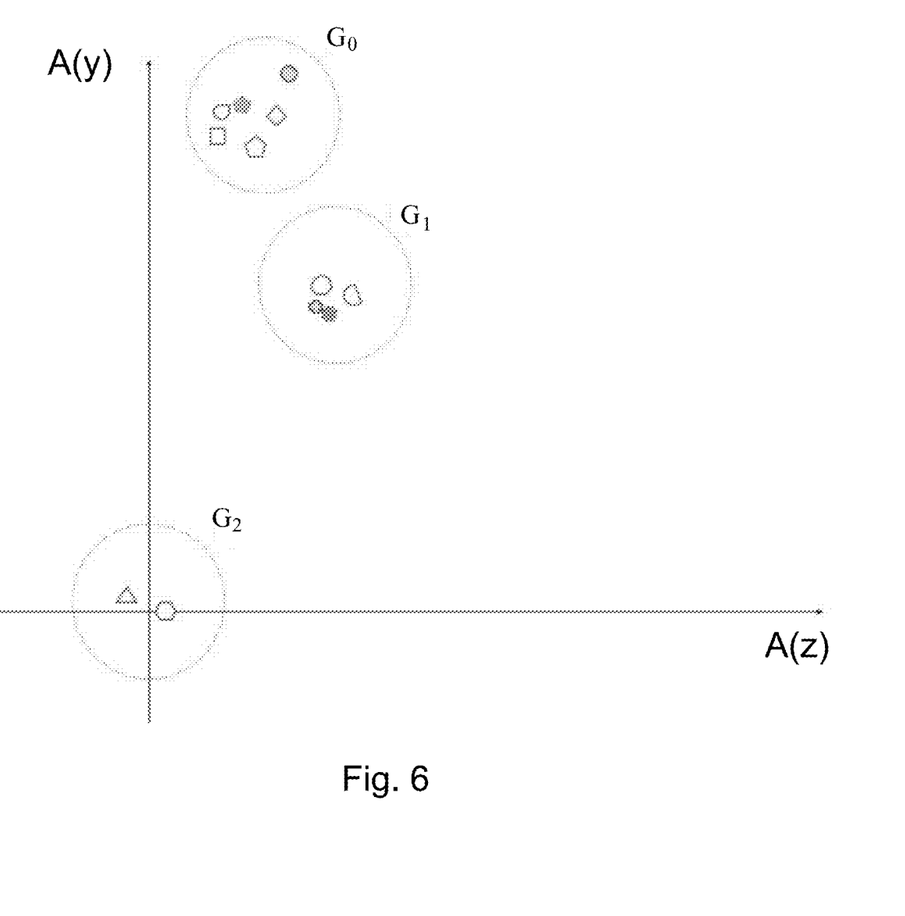
FIG. 6 presents an example of clustering of 8 weights (non-filled shapes) and 2 bars (filled shapes) into 3 groups.

Naturally a plurality of sensors 1 may be associated/clustered with a plurality of bars 5 wherein each bar is associated/clustered with a different set of sensors 1. For example 2 persons exercising with two dumb bells each. Each of the two persons configures its mobile device 4 to be associated with the respective two bars/grip portions of the dumb bells and received reports on weights moved only with those two associated bars. FIG. 6 provides a further reference on this matter.

Lastly, at step 307, the data collecting device 3 transmits to the user's mobile device 4 data on the exercise, for example, exercise repetitions count from the start as well as weight information. The data are associated with a given bar 5 (or equivalent) as paired.

In other words, there is calculated weight for each of the clusters based on weight information of each sensor (1) associated with that particular group/cluster.

Figure 4:
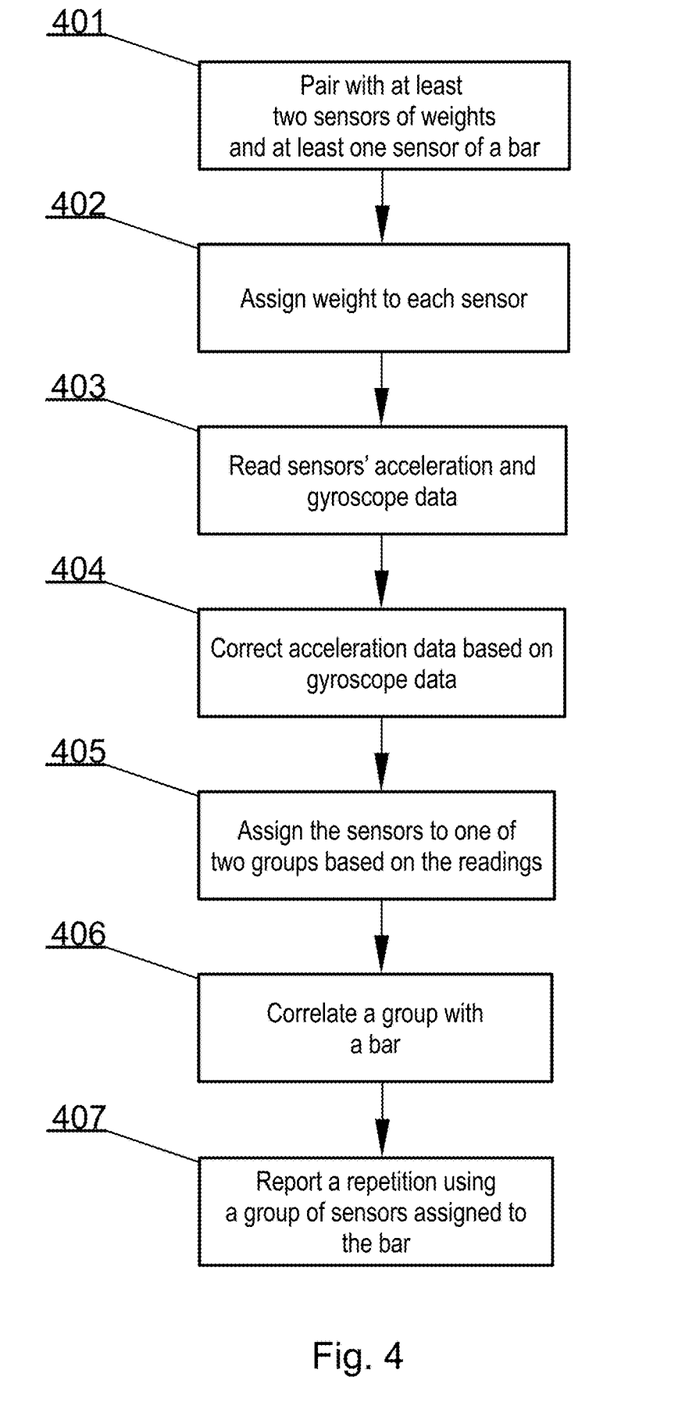
FIG. 4 presents a diagram of the method for processing sensor's data according to the present invention.

FIG. 4 presents a diagram of the method for processing sensor's data according to the present invention. The method is executed by the aforementioned data collecting device 3.

At step 401 there is executed pairing with at least two sensors 1 of weights and at least one sensor of a bar 5. The sensors 1 may automatically identify themselves as a sensors 1 assigned to a bar 5 or a weight, however as another option such assignment may be made at the data collecting device thereby allowing for all the sensors 1 to be the same.

As explained above there may be more than one sensor 1 assigned to a single bar 5 and there may be more than one bar configured in the system. For example a first bar B1 with one sensor S1 and a second bar B2 with assigned two sensors S2 and S3 preferably positioned at the ends of the bar B2. Each bar sensor 1 may also report weight of the bar 5. In case there are more than one sensor on a bar 5, only one of them may report the weight of the bar 5, or each sensor 1 may report a portion of the total weight of the bar 5, e.g. 0.5*weight in case of two sensors 1.

Next, at step 402 there is assigned weight to each sensor 1. Sensors 1 are not fixedly assigned to weights as they may be mounted on different weights.

After the setup process, the system may detect/collect 403 sensors' acceleration and gyroscope data (motion or movement data sets per sensor). This may be done after an explicit start signal from a user's mobile device 4.

At step 404 a process is executed to correct acceleration data based on gyroscope data, this process will be described in more details with reference to FIG. 5. Corrected acceleration data are stored at corrected motion data sets.

Based on the corrected readings the sensors are assigned 405 to one of two groups i.e. a group of moving sensors and a group of non-moving sensors. This may otherwise be called identifying moving sensors among the sensors. From which data have been received.

Further, at step 406, based on selected one of more bars for the given exercise the moving sensors are assigned to each bar in use. The system is aware, which sensors are bar 5 sensors 1 and which sensors 1 are weights sensors. The grouping is based on the corrected acceleration data being concurrent among the respective corrected motion data sets as explained in more details with reference to FIGS. 5A, 5B and 6.

The sensors (and thereby their associated items) may be grouped/clustered based on current correlated movement data as well as historical data and/or characteristic parameters such as weight, associated object type, size etc. Historical data describe preceding movements of sensors (also in groups). Which may be also used in order to determine current grouping.

The grouping may be based on calculating a distance parameter (eg. Euclidean distance or using weights denoting how significant a given parameter is on potential grouping) between points that represent sensors in a multidimensional space (e.g. 3 dimensions based on a movement and additional dimensions such as time, weight etc.). Dimensions correspond to component dimensions of a movement in time and measurable characteristic parameters, that are constant. Owing to this the sensors affixed to weights/objects sharing the same movement will be represented by points that are relatively close to each other in space and remote from sensors moving differently or stationary sensors. Groups of points in such a space may be determined by using known methods such as k-means, HCA, or Density-based clustering.

Lastly, at step 407, the system report a repetition using a group of sensors assigned to the selected bar. A repetitions counting may be further set up to take into account movement exceeding a given threshold distance, which may be predefined by a user depending on a free weight type as well as on an exercise type.

Figure 5A:
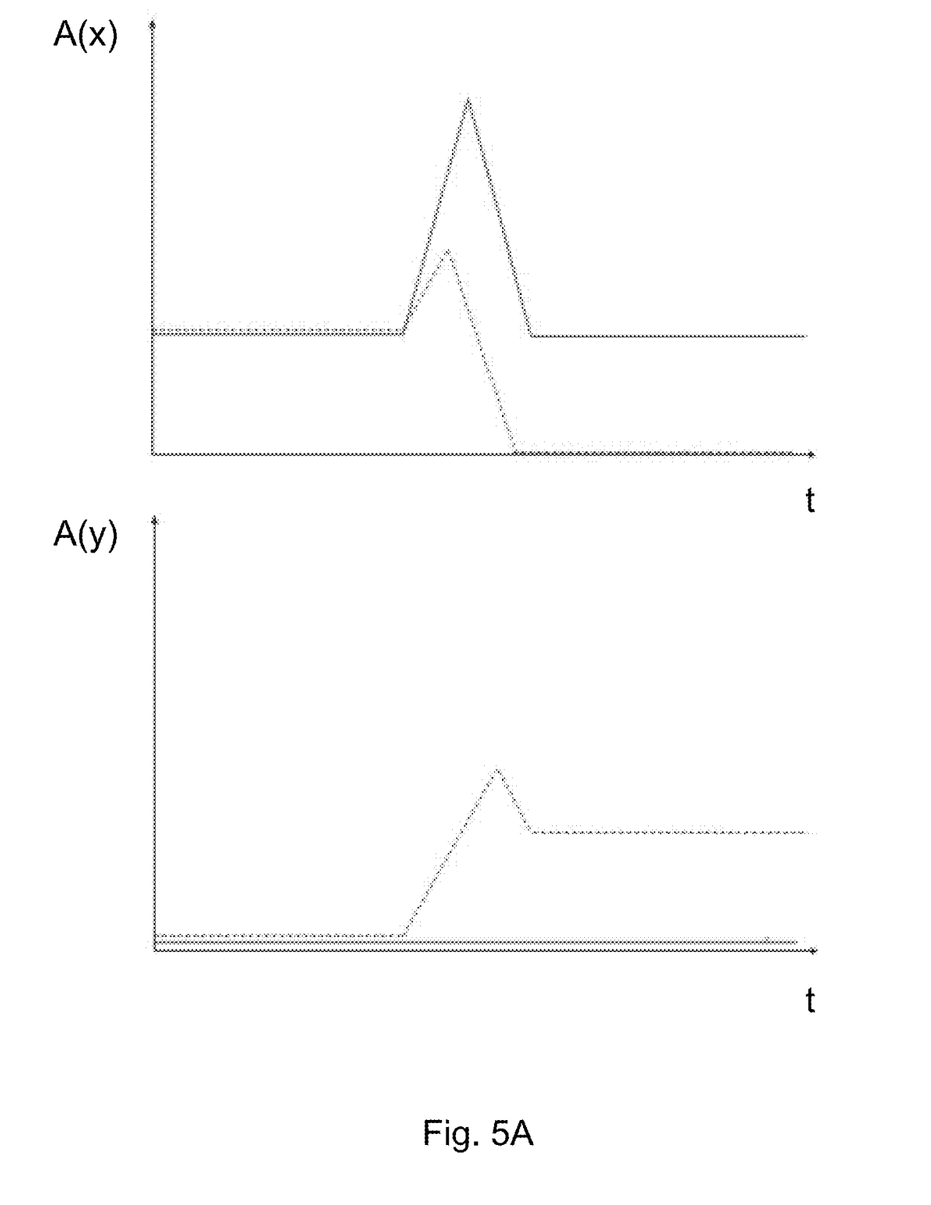
FIGS. 5A-B show a process for correcting acceleration data with gyroscope data with reference to sensors.
Figure 5B:
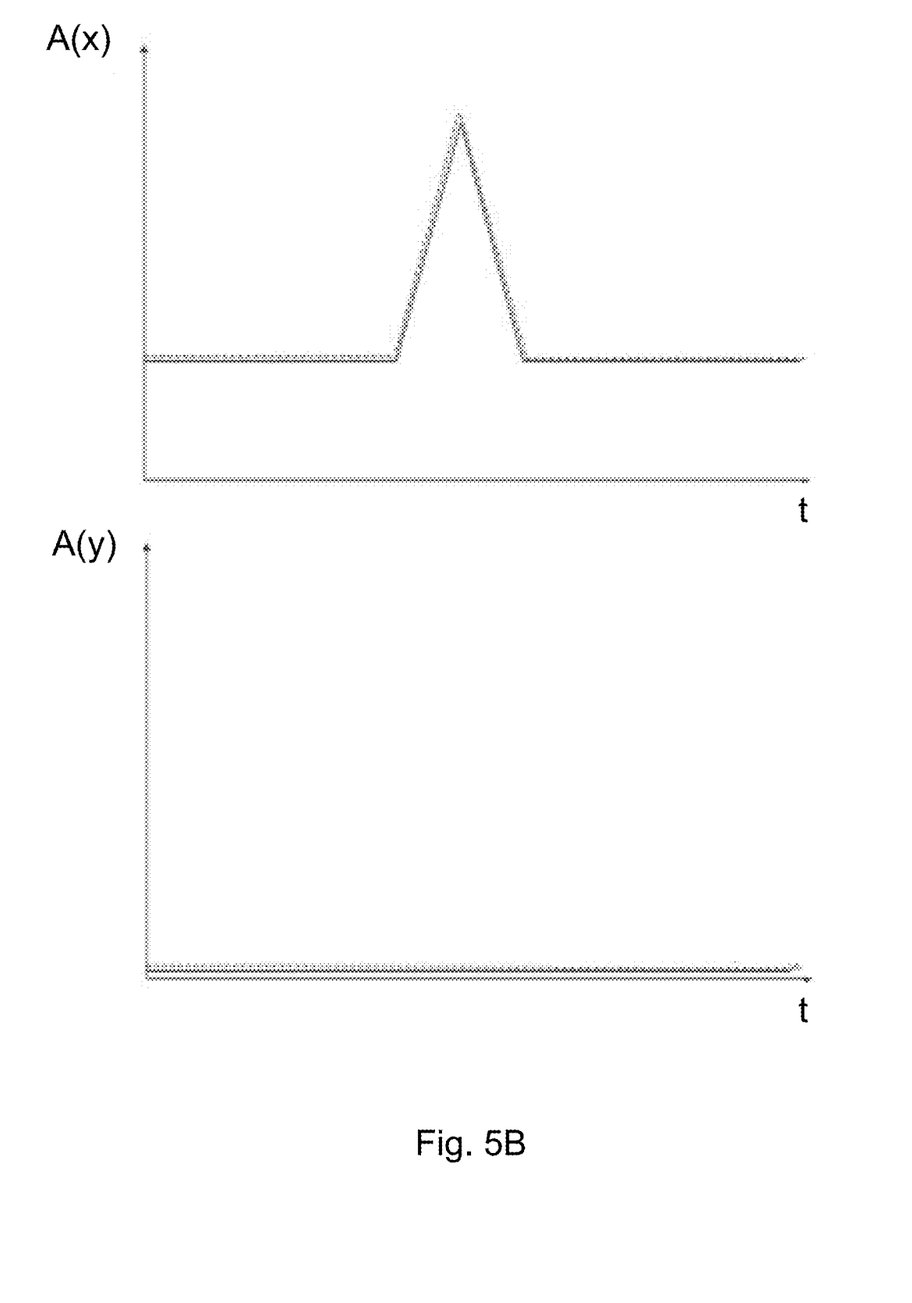

FIGS. 5A-B show a process for correcting acceleration data with gyroscope data with reference to the sensors 1.

A problem has been identified, where weights may rotate on the respective bar 5 while the exercise takes place. This may result in counting weight erroneously. This problem has been addressed with a use of a gyroscope together with an accelerometer in each sensor 1 mounted on a weight.

Use of a gyroscope allows to detect rotation of a weight (together with its associated sensor 1) on a bar 5 as well as a transformation of a signal from a corresponding accelerometer by a rotation of a coordinate system so that acceleration caused by gravity always remains in the same axis. This allows for clustering of the weights.

FIG. 5A presents an exemplary graph for X and Y axes of an accelerometer of S1 and S2 sensors, wherein the S1 sensor did not rotate during movement of an exercise while the S2 sensor has rotated by 90 degrees during that same exercise thereby exchanging the X and Y axes with one another and remained in that final position.

When applying a correction based on a signal from a corresponding gyroscope, the graphs for X and Y axes of the accelerometer of the S1 and S2 sensors have a form shown in FIG. 5B.

The aforementioned correction may be effected by rotating an accelerometer's vector of acceleration by a rotation identified by a corresponding gyroscope and by optionally subtracting gravity value from the reading.

An acceleration vector [x, y, z] is preferably given without gravity taken into consideration so that a direction, speed, location as well as the gravity vector [x, y, z] may be determined. Based on the gravity vector [x, y, z] orientation of an object may be determined in relation to a reference Surface (e.g. a floor).

As an alternative, when gravity value is not subtracted, data may be standardized such that gravity acceleration vector is aligned with one of the three axes x or y or z.

Further, the following specific equations may be used. 'Angle' is an angle calculated with one of Sensor Fusion methods—in this case it is a complementary filter:

$$angle_{\alpha\beta\gamma} = (1.0-A)*(angle_{\alpha\beta\gamma} + gyroscope*dt) + A*V_{acc}$$

Where α is a yaw, β is a pitch and γ is a roll, and an A coefficient is experimentally determined based on characteristics (e.g. measurement accuracy, maximum measurement error, average measurement error and the like) of the gyroscope and the accelerometer.

Assuming that data from the accelerometer are in a form of a column vector:

$$V_{acc} = \begin{bmatrix} x \\ y \\ z \end{bmatrix}$$

where x/y/z are acceleration values in the respective axes, then the acceleration vector V' rotated by the 'Angle' of the preceding step, may be formulated as follows V':

$$\begin{bmatrix} x' \\ y' \\ z' \end{bmatrix} = \begin{bmatrix} \cos\alpha\cos\beta & \cos\alpha\sin\beta\sin\gamma - \sin\alpha\cos\gamma & \cos\alpha\sin\beta\cos\gamma + \sin\alpha\sin\gamma \\ \sin\alpha\cos\gamma & \sin\alpha\sin\beta\sin\gamma + \cos\alpha\cos\gamma & \sin\alpha\sin\beta\cos\gamma - \cos\alpha\sin\beta \\ -\sin\beta & \cos\beta\sin\gamma & \cos\beta\cos\gamma \end{bmatrix} \begin{bmatrix} x \\ y \\ z \end{bmatrix}$$

A resulting vector $V_r$ is obtained as a difference between the V vector and a default gravity vector $V_g$, values of which may be determined during calibration:

$$V_r = V - V_g$$

Owing to such a transformation of signals, despite being rotated during the same movement of the bar, the sensors of weights mounted on the bar will in the end look the same, which in turn will facilitate their clustering.

In the data collecting device 3 there is executed a clustering of data obtained from the respective sensors 1. In this process there may be taken into account different criteria such as at least one of: 3D accelerometer data after a transformation based on gyroscope data, level of accelerometer data dynamics, time, past clustering data, the total load of a bar being symmetric, correlation of weights movement with bar movement.

FIG. 6 presents an example of clustering of 8 weights (non-filled shapes) and 2 bars (filled shapes) into 3 groups by taking into account raw data of accelerometers in the Z and Y axes at a given time t. The figure shows 2 differently moving bars with their respective weights G0, G1 and separately a group G2 of weights that comprises weights not used during the exercise.

In such an arrangement preferably only samples from sensors positioned on bars are used in order to determine a repetition. Such repetition counting may be based on predefined thresholds for movements.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system".

Furthermore, the present invention may take the form of a computer program product embodied in any tangible medium of expression having computer usable program code embodied in the medium.

It can be easily recognized, by one skilled in the art, that the aforementioned method for monitoring a free weight system may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A method for monitoring a free weight system comprising sensors, each sensor being either a bar sensor or a weight sensor, a load bearing member having a bar sensor mounted thereon and at least one weight mounted on the load bearing member, each weight having a weight sensor mounted thereon, wherein each sensor comprises an accelerometer and a gyroscope and is assigned a weight value, the method comprising the steps of:
    receiving, from the sensors, acceleration data and gyroscope data as motion data sets;
    for each of the motion data sets, correcting the acceleration data based on the gyroscope data of the motion data set, to obtain corrected acceleration data;
    identifying a plurality of the sensors as moving sensors based on the corrected acceleration data of the sensor;
    grouping, among the moving sensors, the bar sensor with at least one the weight sensors into one or more groups based on the corrected acceleration data being concurrent among the respective corrected motion data sets.

2. The method according to claim 1, comprising obtaining the corrected acceleration data by rotating an accelerometer's vector of acceleration by a rotation identified by the gyroscope.

3. The method according to claim 2, comprising obtaining the corrected acceleration data by further subtracting a gravity value.

4. The method according to claim 1, wherein said sensor further comprises a magnetometer, while the step of correcting acceleration data further comprises correcting drift.

5. The method according to claim 1, comprising communicating with each sensor by using a sub-1 GHz wireless communication.

6. The method according to claim 1, wherein the grouping is further based on constant characteristic parameters associated with a each sensor and movement similarity in time between the sensors among the moving sensors.

7. The method according to claim 1, further comprising calculating a group weight value for each of the one or more groups based on the weight values of each sensor associated with that particular group.

8. A computer program comprising program code means for performing all the steps of the method according to claim 1 when said program is run on a computer.

9. A computer readable medium storing computer-executable instructions performing all the steps of the method according to claim 1 when executed on a computer.

10. A system for monitoring a free weight system comprising sensors, each sensor being either a bar sensor or a weight sensor, a load bearing member having a bar sensor mounted thereon and at least one weight mounted on the load bearing member, each weight having a weight sensor mounted thereon, wherein each sensor comprises an accelerometer and a gyroscope and is assigned a weight value, the system further comprising a controller configured to:
    receive, from the sensors, acceleration data and gyroscope data as motion data sets sampled at a sampling instant;
    for each of the motion data sets, correct the acceleration data based on the gyroscope data of the motion data set, to obtain corrected acceleration data;
    identify a plurality of the sensors as moving sensors based on the corrected acceleration data of the sensor;
    group, among the moving sensors, the bar sensor with at least one of the weight sensors into one or more groups based on the corrected acceleration data being concurrent at the sampling instant among the respective corrected motion data sets.

\* \* \* \* \*